ELECTRICALLY CONDUCTIVE ADHESIVE TAPE
Filed March 22, 1951
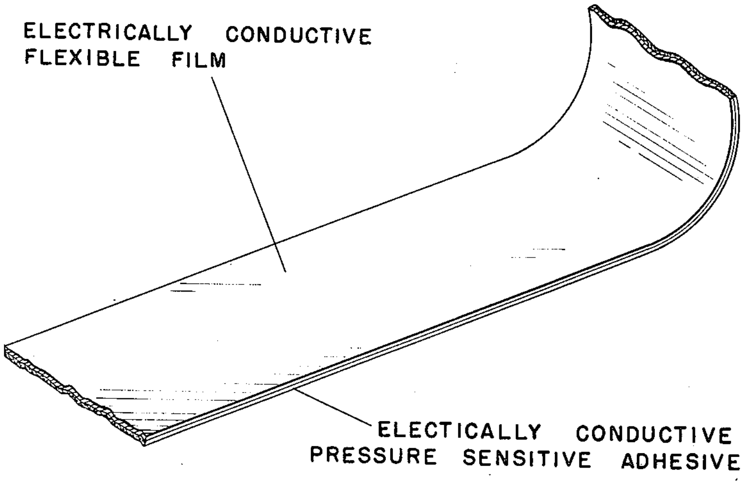
Inventors
Joseph J. Coleman
and Sam Kurlandsky
By
Jones, Darbo & Robertson Att'ys.

2,808,352

ELECTRICALLY CONDUCTIVE ADHESIVE TAPE

Joseph J. Coleman, Freeport, and Sam Kurlandsky, Rock Island, Ill., assignors to Burgess Battery Company, Freeport, Ill., a corporation of Delaware Application March 22, 1951, Serial No. 217,047

5 Claims. (Cl. 117—227)

This invention relates to adhesive tapes, more particularly an industrial tape consiting of an electrically conductive backing and an electrically conductive pressure sensitive adhesive coating.

The new article of manufacture herein described and claimed is capable of conducting electricity from the outer surface of the adhesive coating, through the coating and backing sheet material to the exposed surface of the backing. This is the principal and novel characteristic of the tape of the invention. Since the entire structure of the tape is electrically conductive, electricity may flow in lateral directions as well as transversely through the thickness of the tape, as described. With this material, temporary or permanent electrical connection may very easily be established by applying a piece of the tape to the surfaces of the two conductors to be connected or by providing a contact between two pieces of tape each of which is in electrical contact with the conductors to be connected. The range of uses for this electrically conductive tape is as broad as the entire electrical field.

The tape backing may be any suitable flexible conductive sheet material, such as aluminum, tin, lead, silver, zinc or copper foil. Other sufficiently conductive materials may, of course, be used, but those mentioned are considered to be most useful as standard tapes for a broad range of applications.

A suitable adhesive base for the conductive coating for the backing may be of the pressure sensitive type. A satisfactory tacky material for this purpose may be prepared with polyisobutylene as the principal constituent. A plasticizer, such as dioctyl phthalate, is compounded with the polyisobutylene to impart the desired physical characteristics to the adhesive material. A solvent is used as a means for applying the coating to the backing.

A short length of the electrically conductive adhesive tape of the invention is illustrated on somewhat enlarged scale in the single figure of the drawing. As the legends indicate, the tape backing is a suitable film material which is electrically conductive and flexible as, for example, aluminum foil. The under surface of this film tape backing is covered with an electrically conductive pressure sensitive adhesive material forming an adherent coating which is normally tacky for adhesion to a conductive body to which the tape may be applied. This coating may comprise, for example, a pressure sensitive adhesive composition, such as plasticized polyisobutylene, impregnated with finely divided silver to render the coating electrically conductive.

We have found that a highly conductive adhesive material may be prepared by impregnating the adhesive base, such as that described above, with finely divided silver. The adhesive material serves as a binder for the silver particles as well as a means for attaching the conductive backing of the tape to the surface of a conductor to which electrical connection is to be made. The finely divided silver used in the preparation of the adhesive mixture may be produced by the dry reduction of oxides of silver, by spraying the molten metal, by an electrolytic process, or by chemical precipitation. The characteristics of the mixtures made from the different forms of silver differ somewhat, but useful compositions may be prepared from any of these several forms of raw material.

In order to achieve the highly desirable maximum conductivity of the adhesive mass, the finely divided silver is preferably prepared by milling the silver particles, such as precipitated silver, by any suitable means as, for example, in a ball mill. By this proceses, commercial precipitated silver having a size range of from, say, 2 to 100 microns and an apparent density of about 1½ grams per cubic centimeter is converted to a product of reduced particle size and greatly increased apparent density. As a further result of the milling process, it appears that the porosity of the individual particles and the surface form thereof are altered in such a way as to contribute improved conductivity characteristics to the adhesive mass.

As a specific example of a preferred conductive adhesive mixture for use in coating the conductive backing in the manufacture of the tape of the invention, ingredients and preparation methods may be specified as follows:

A mixture of 35 parts by weight of polyisobutylene (in a medium molecular weight range) and 200 parts of naphtha (solvent) is heated until the polyisobutylene is completely dissolved in the naphtha. About 4 parts of dioctyl phthalate (plasticizer) is then added to the solution after which 40 parts of finely divided silver are slowly incorporated in the liquid with constant stirring. When this mass has been thoroughly mixed, it is ready for application to the backing of, for example, aluminum foil. A coating of the adhesive mixture may be applied to the foil by spraying or other suitable means. Evaporation of the solvent leaves a tacky film which readily adheres to dry surfaces.

It will be appreciated that the utility of the electrically conductive tape of the invention is considerably enhanced by reason of the flexibility of the tape which permits ready conformity to the irregularities of the surfaces to which the tape is applied. Increased physical contact resulting therefrom increases the efficiency of the tape as an electrical conductor. It may also be pointed out that the tape fabricated from metallic foils serves to seal a surface, such as a porous carbon surface, as well as establish electrical contact therewith. This dual function is highly advantageous in certain industrial applications.

Many useful applications of the novel product described herein will occur to persons concerned with electrical apparatus. The tape may be used for temporary connections and where soldering is inconvenient or impossible. For example, good electrical connections may readily be made to such conductors as carbon, magnesium, aluminum, and tantalum.

It will be understood that the invention has been described by way of example only and that there are many alternative materials and production methods which may be employed without departing from the teaching and spirit thereof.

Invention is claimed as follows:

1. An electrically conductive adhesive tape comprising a backing of thin electrically conductive sheet material and an electrically conductive coating on a surface thereof exposed for adhesive application to a solid body, said coating being an adhesive composition consisting approximately of 35 parts by weight of polyisobutylene, 40 parts of finely divided silver, and a plasticizer.

2. An electrically conductive adhesive tape comprising a backing of aluminum foil and an electrically conductive coating on a surface thereof exposed for adhesive application to a solid body, said coating being an adhesive composition consisting approximately of 35 parts by weight of polyisobutylene, 40 parts of finely divided silver, and a plasticizer.

3. An electrically conductive adhesive tape comprising a backing of metallic foil and an electrically conductive coating on a surface thereof exposed for adhesive application to a solid body, said coating being an adhesive composition comprising polyisobutylene impregnated with finely divided silver.

4. As a new article of manufacture, an electrically conductive adhesive tape comprising a backing of electrically conductive flexible film material and an electrically conductive coating upon a surface thereof and adhering thereto, said coating comprising a normally tacky pressure sensitive adhesive composition impregnated with finely divided silver, said electrically conductive adhesive tape being characterized in that said coating is normally exposed for adhesive application of said tape to a solid body at an indefinite time subsequent to manufacture thereof whereby to provide an electrically conductive adhesive tape as a finished article of manufacture.

5. As a new article of manufacture, an electrically conductive adhesive tape comprising a backing of aluminum foil and an electrically conductive coating upon a surface thereof and adhering thereto, said coating comprising a normally tacky pressure sensitive adhesive composition impregnated with finely divided silver, said electrically conductive adhesive tape being characterized in that said coating is normally exposed for adhesive application of said tape to a solid body at an indefinite time subsequent to manufacture thereof whereby to provide an electrically conductive adhesive tape as a finished article of manufacture.

References Cited in the file of this patent

UNITED STATES PATENTS

| | | |
|---|---|---|
| 882,770 | Meulen | Mar. 24, 1908 |
| 2,037,749 | Anderson | Apr. 21, 1936 |
| 2,200,363 | Kreis | May 14, 1940 |
| 2,441,945 | Frolich et al. | May 25, 1948 |
| 2,463,452 | Yule | Mar. 1, 1949 |